(12) United States Patent
Lee et al.

(10) Patent No.: US 12,536,343 B2
(45) Date of Patent: Jan. 27, 2026

(54) SECURITY DEVICE AND SUBSTRATE

(71) Applicant: ICTK Co., Ltd., Seongnam-si (KR)

(72) Inventors: Kyung Tek Lee, Seoul (KR); Jae Seong Lee, Seoul (KR); Du Hyun Jeon, Seoul (KR)

(73) Assignee: ICTK Co., Ltd., Seoul (KR)

( * ) Notice: Subject to any disclaimer, the term of this patent is extended or adjusted under 35 U.S.C. 154(b) by 121 days.

(21) Appl. No.: 18/637,504

(22) Filed: Apr. 17, 2024

(65) Prior Publication Data
US 2024/0346190 A1   Oct. 17, 2024

(30) Foreign Application Priority Data

Apr. 17, 2023 (KR) .................. 10-2023-0050204

(51) Int. Cl.
| | |
|---|---|
| *G06F 21/85* | (2013.01) |
| *G06F 7/58* | (2006.01) |
| *G06F 21/71* | (2013.01) |
| *H01L 23/00* | (2006.01) |

(52) U.S. Cl.
CPC .............. *G06F 21/85* (2013.01); *G06F 7/588* (2013.01); *G06F 21/71* (2013.01); *H01L 23/576* (2013.01)

(58) Field of Classification Search
CPC ................................ G06F 21/85; G06F 21/71
See application file for complete search history.

(56) References Cited

U.S. PATENT DOCUMENTS

| | | | | |
|---|---|---|---|---|
| 9,520,448 | B1* | 12/2016 | McCollum | G11C 13/003 |
| 10,313,368 | B2* | 6/2019 | Touboul | H04L 63/1416 |
| 10,380,335 | B1* | 8/2019 | Vargas | G06F 21/57 |
| 10,380,385 | B1* | 8/2019 | Hughes | G06F 21/88 |
| 10,452,849 | B2* | 10/2019 | Vroom | G06F 21/85 |
| 11,689,376 | B2* | 6/2023 | Ahn | H04L 9/3278 380/44 |
| 11,727,156 | B2* | 8/2023 | Klapman | G06F 21/602 726/26 |
| 11,924,359 | B2* | 3/2024 | Ahn | H04L 9/3278 |
| 2007/0228515 | A1* | 10/2007 | Asahi | H01L 23/585 257/E21.022 |
| 2016/0063462 | A1* | 3/2016 | Whytock | G06Q 20/3829 705/71 |
| 2019/0088325 | A1 | 3/2019 | Wu et al. | |

FOREIGN PATENT DOCUMENTS

| | | |
|---|---|---|
| CN | 109522753 | 3/2019 |
| KR | 10-2015-0027014 | 3/2015 |
| KR | 10-2017-0002053 | 1/2017 |
| KR | 10-2282855 | 7/2021 |

OTHER PUBLICATIONS

Request for the Submission of An Opinion Dated Mar. 25, 2025 From the Korean Intellectual Property Office Re. Application No. 10-2023-0104667 and Its Translation Into English. (13 Pages).

* cited by examiner

Primary Examiner — Viral S Lakhia

(57) ABSTRACT

Provided are a security device and a substrate.

15 Claims, 14 Drawing Sheets

SECURITY DEVICE AND SUBSTRATE

CROSS-REFERENCE TO RELATED APPLICATION

This application claims the benefit of priority of Korean Patent Application No. 10-2023-0050204, filed on Apr. 17, 2023, the contents of which are incorporated by reference as if fully set forth herein in their entirety.

FIELD AND BACKGROUND OF THE INVENTION

1. Field of the Invention

The present invention relates to a security device and a substrate including the same.

2. Discussion of Related Art

As the information society becomes more sophisticated, the necessity to protect personal privacy is also increasing, and technology for building a security system for encrypting and decrypting information and transmitting the information is becoming essential technology.

In addition to high-performance computers, the use of computing devices in the form of embedded systems or systems on chips (SoCs) is growing rapidly in the advanced information society. For example, computing devices, such as radio frequency identification (RFID) devices, smart cards, universal subscriber identity modules (USIMs), one-time password (OTP) devices, and the like, are widely being used.

To build a security system for such a computing device, a cryptographic key used in encryption and decryption algorithms or a unique identifier (ID) is used. A cryptographic key or a unique ID will be referred to below as an identification key. As such an ID key, a cryptographically secure random number is frequently generated out of a device and stored in a non-volatile memory such as a flash memory, an electrically erasable programmable read-only memory (EEPROM), or the like.

In recent years, various physical security attacks, such as side channel attacks, reverse engineering attacks, and the like, have been carried out against identification keys stored in non-volatile memories of computing devices. As a method of safely generating an identification key against such attacks, physically unclonable function (PUF) technologies are under development.

PUFs represent a technology for generating an identification key by taking advantage of subtle differences in physical characteristics of electronic systems, and are also known as hardware fingerprints.

Further, to seize security information, such as information stored in an integrated circuit (IC), information about an operation performed by the IC, and/or the like, from the IC, an invasive attack is carried out on the IC in many cases.

For example, attackers may disassemble a device including an IC, such as a semiconductor device, apply power to the IC, and then attempt to obtain secure information through probing. Semiconductor devices may have a structure for detecting an invasive attack by detecting such disassembly. However, more advanced invasive attack techniques are being developed that may disable even disassembly detection structures, and thus a robust security technology for defending against the invasive attack techniques is necessary.

SUMMARY OF THE INVENTION

The present invention is directed to providing a security device of which security is enhanced by employing a protection circuit against physical security attacks, and a substrate including the security device.

The present invention is also directed to providing a security device of which security against attacks (invasive attacks) on a chip or package substrate is enhanced by employing a shielding structure in a lower die, and a substrate including the security device.

The present invention is also directed to providing a security device of which security is enhanced by changing a sequence in which an input signal is input to lines or an output signal is received from lines, and a substrate including the security device.

Objects to be achieved by embodiments of the present invention are not limited thereto, and solutions described below and purposes or effects that may be found in embodiments may also be included in the objects.

According to an aspect of the present invention, there is provided a security device including an interconnect layer including first lines and second lines, a controller configured to output a control signal to the interconnect layer, a driver configured to apply an input signal to the first lines according to the control signal, a reader connected to the second lines and configured to receive an output signal corresponding to the input signal, and a security part configured to perform authentication on the basis of the output signal.

Any one of the first lines may cross the second lines, and any one of the second lines may cross the first lines.

The security device may further include a generator including a true-random-number generator (TRNG), and the generator may change an input sequence in which the input signal is input to the first lines or a receiving sequence in which the output signal is received from the second lines.

The controller may calculate a resistance according to the input signal and the output signal and store the resistance in a storage.

The interconnect layer may include at least one of contacts and vias that are designed and manufactured according to a standard deviating from design rules prescribed for a semiconductor fabrication process.

The first lines may be randomly connected to the second lines through the contacts or the vias.

Whether the first lines and the second lines are shorted may be fixed and invariant over time.

The security device may further include a key generator configured to generate an identification key on the basis of the output signal.

The security part may determine whether the interconnect layer operates on the basis of the identification key.

The security part may compare the identification key generated by the key generator with a certain output signal corresponding to a certain input signal.

The driver may include a decoder, and the reader may include a current sensing circuit.

The interconnect layer may include a plurality of first transistors disposed between the first lines and the second lines, and the plurality of first transistors may be randomly connected to the plurality of second transistors.

The input signal may be applied to the first lines at time intervals.

The output signal may have a period corresponding to a total time in which the input signal is applied to the first lines.

According to another aspect of the present invention, there is provided a security device including an interconnect layer including first lines and second lines which extend in different directions and cross each other, a controller configured to output a control signal to the interconnect layer, a driver configured to apply an input signal to the first lines according to the control signal, and a reader connected to the second lines and configured to receive an output signal corresponding to the input signal. Whether the interconnect layer is shorted may vary depending on a process variation occurring in a semiconductor fabrication process.

According to another aspect of the present invention, there is provided a substrate including a lower die and an upper die disposed on and electrically connected to the lower die. At least one of the upper die and the lower die includes an interconnect layer including first lines and second lines which extend in different directions and cross each other, a controller configured to output a control signal to the interconnect layer, a driver configured to apply an input signal to the first lines according to the control signal, a reader connected to the second lines and configured to receive an output signal corresponding to the input signal, and a security part configured to perform authentication on the basis of the output signal.

At least one of the first lines and the second lines may be disposed in a lower region of the lower die.

The interconnect layer may include at least one of contacts and vias that are designed and manufactured according to a standard deviating from design rules prescribed for a semiconductor fabrication process, and the first lines may be randomly connected to the second lines through the contacts and the vias.

Whether the first lines and the second lines are shorted may be fixed and invariant over time.

The substrate may further include a generator configured to generate an identification key on the basis of the output signal, and the security part may compare the identification key with a certain output signal corresponding to a certain input signal.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which.

DESCRIPTION OF SPECIFIC EMBODIMENTS OF THE INVENTION

Figure 1:
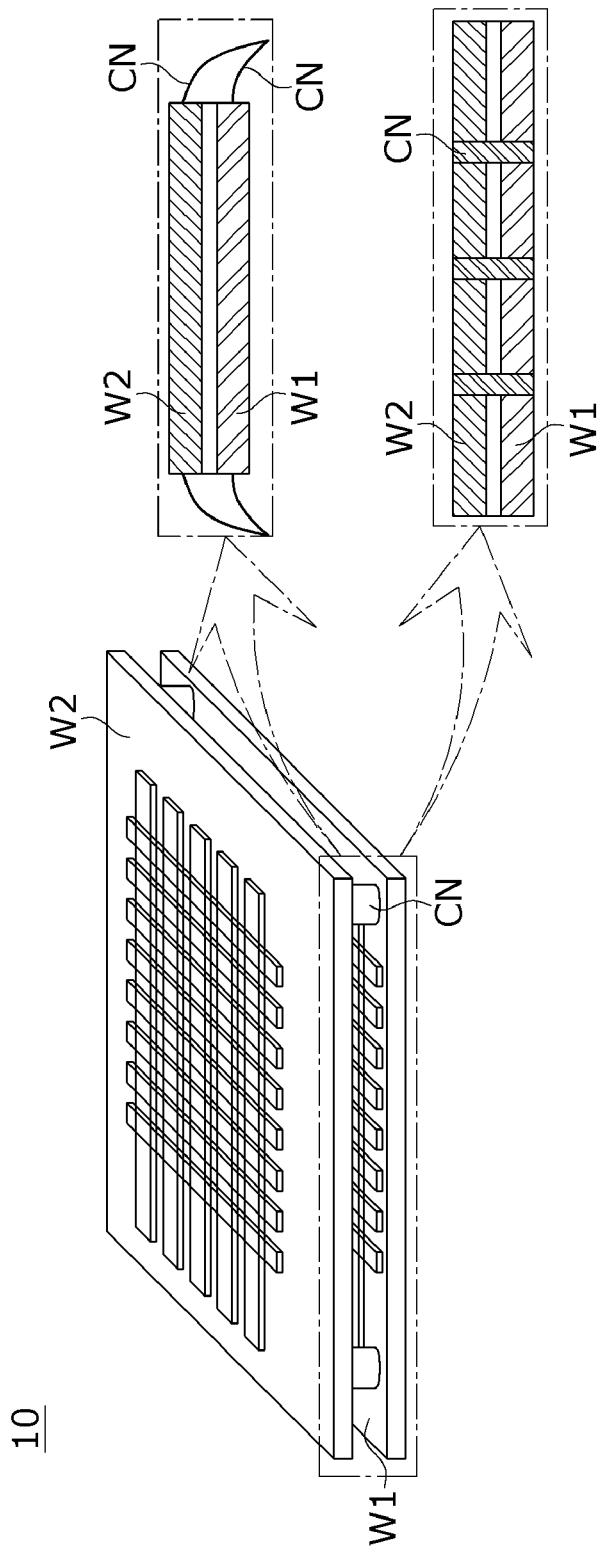
FIG. 1 is a perspective view of a substrate according to an exemplary embodiment.

Since the present invention can be variously modified and have several embodiments, specific embodiments will be illustrated in the drawings and described. However, this is not intended to limit the present invention to the specific embodiments, and it is to be understood that the present invention includes all modifications, equivalents, and substitutions within the spirit and technical scope of the present invention.

Terms including ordinal numbers, such as "second," "first," and the like, may be used for describing various components, but the components are not limited by the terms. The terms are only used for the purpose of distinguishing one component from another. For example, a second component may be named a first component without departing from the scope of the present invention, and a first component may likewise be named a second component. The term "and/or" includes any one or a combination of a plurality of related stated items.

When a first component is referred to as being "connected" or "coupled" to a second component, the first component may be directly connected or coupled to the second component, or an intermediate component may be therebetween. On the other hand, when a first component is referred to as being "directly connected" or "directly coupled" to a second component, there is no intermediate component therebetween.

Terminology used in this specification is used only for describing specific embodiments and is not intended to limit the present invention. The singular forms include the plural forms as well unless the context clearly indicates otherwise. In this specification, the terms "comprise," "comprising," "include," "including," "have," "having," and the like indicate the presence of features, integers, steps, operations, components, parts, or combinations thereof stated herein and do not preclude the possibility of presence or addition of one or more other features, integers, steps, operations, components, parts, or combinations thereof.

Unless otherwise defined, all terms including technical or scientific terms used herein have the same meaning as generally understood by those of ordinary skill in the art. Terms defined in generally used dictionaries are construed as having the same meaning as would be construed in the context of the related art. Unless defined clearly in this specification, the terms are not interpreted in an ideal or excessively formal sense.

Hereinafter exemplary embodiments of the present invention will be described in detail with reference to the accompanying drawings. Throughout the drawings, like reference numerals refer to like components, and duplicate descriptions thereof will be omitted.

Figure 2:
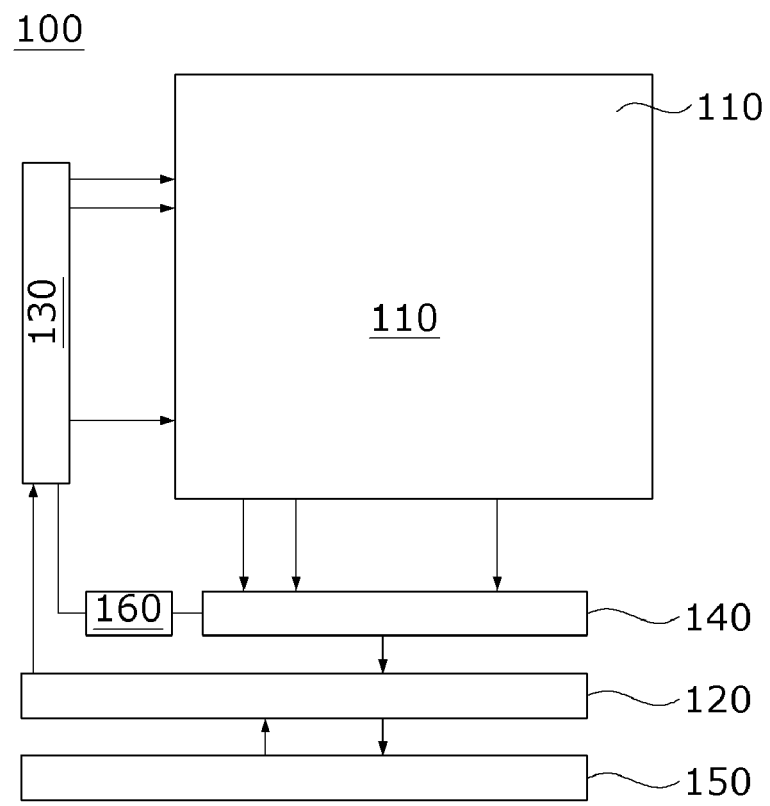
FIG. 2 is a block diagram of a security device according to an exemplary embodiment.

FIG. 1 is a perspective view of a substrate according to an exemplary embodiment, and FIG. 2 is a block diagram of a security device according to an exemplary embodiment.

Referring to FIG. 1, a substrate 10 according to the exemplary embodiment may include a plurality of dies (wafers, chips, or the like) and connectors (e.g., wires, via electrodes, or the like) which connect the plurality of dies.

According to the exemplary embodiment, the substrate 10 may include a lower die W1 and an upper die W2. The upper die W2 may be disposed on the lower die W1.

The upper die W2 and the lower die W1 may be electrically connected. For example, the upper die W2 and the lower die W1 may be electrically connected through connectors CN. The connectors CN may include various connection methods. For example, the connectors CN may include wires or through electrodes (e.g., through-silicon vias (TSVs)) as shown in the drawing.

The upper die W2 and the lower die W1 may include a security device which will be described below. For example, the security device or components of the security device may be disposed on at least one of the upper die W2 and the lower die W1. Accordingly, the substrate 10 may include the security device. As an example, a shielding structure for security may exist on the upper surface of the upper die W2. For example, the upper die W2 may have an active shielding structure. Also, the lower die W1 may have a shielding structure including an interconnect layer which will be described below. Accordingly, at least one of first lines and second lines may be disposed in a lower region of the lower die W1. Due to this configuration, the substrate 10 according to the exemplary embodiment can ensure security against attacks (physical attacks) on the upper or lower side. In particular, according to the exemplary embodiment, it is also possible to ensure security against attacks on the lower side of a substrate, a package substrate, or the like. The upper die W2 may also have a shielding structure including an interconnect layer according to the exemplary embodiment.

Referring to FIG. 2, in the substrate according to the exemplary embodiment, a security device 100 may include an interconnect layer 110, a controller 120, a driver 130, a reader 140, a security part 150, and a generator 160.

The interconnect layer 110 may include a plurality of first lines L1 and a plurality of second lines L2 extending in a certain direction. The plurality of first lines and the plurality of second lines may extend in different directions. Accordingly, any one of the plurality of first lines may cross the plurality of second lines. Also, any one of the plurality of second lines may cross the plurality of first lines. The plurality of first lines and the plurality of second lines may be spaced apart from each other. With this configuration, security can be further enhanced by random connection through contacts and vias which will be described below. According to the exemplary embodiment, whether the interconnect layer 110 is shorted may vary depending on a process variation occurring in a semiconductor fabrication process. For example, whether there is a short between first and second lines may be determined according to the process variation occurring in the semiconductor fabrication process.

The interconnect layer 110 may include a plurality of lines, (traces, electrode patterns, or electrode layers), insulating layers, and the like. The plurality of lines may include the first lines L1 and the second lines L2.

The first lines L1 and the second lines L2 may be disposed in the same layer or different layers of the interconnect layer 110. For example, the first lines L1 and the second lines L2 may be spaced apart in the stacking direction. In other words, the first lines L1 and the second lines L2 may be disposed in different layers. Alternatively, the first lines L1 and the second lines L2 may be disposed in the same line.

According to the exemplary embodiment, the plurality of first lines L1 may extend in one direction. Also, the plurality of second lines L2 may extend in the same direction as the first lines L1 or in a different direction from the first lines L1. For example, the plurality of first lines L1 may extend in the row direction, and the plurality of second lines L2 may extend in the column direction. In the drawings, the plurality of first lines L1 may include a 1-1 line L10 to a 1-N line L1n-1. For example, the number of first lines L1 may be n. The plurality of second lines L2 may include a 2-0 line L20 to a 2-m line L2m-1. For example, the number of second lines L2 may be m. Accordingly, the first lines L1 and the second lines L2 may be arranged in an n×m form in the interconnect layer 110. For example, the interconnect layer 110 may have cells in the n×m form. The cells may correspond to crossing regions at which the first lines L1 and the second lines L2 cross each other. The interconnect layer 110 will be described below on the basis of a 6×6 arrangement among n×m arrangements. Also, vias (contacts) are arranged in the n×m form according to the arrangement of the first lines and the second lines, and the locations of vias will be described as a matrix form.

The plurality of first lines L1 may be connected to the driver 130. The plurality of first lines L1 may receive an input signal from the driver 130. For example, the input signal may be a voltage. The plurality of first lines L1 may be referred to as the plurality of "word lines."

The plurality of second lines L2 may be connected to the reader 140. Some of the plurality of second lines L2 may be electrically connected to the first lines L1 and provide an output signal corresponding to the input signal to the reader 140. For example, the second lines connected to the first lines may provide the output signal (e.g., a voltage, a current, or the like) which differs from the input signal applied to the first lines to the reader 140. The plurality of second lines L2 may be referred to as the plurality of "bit lines."

The controller 120 may output a control signal to the interconnect layer 110. Also, the controller 120 may be connected to the reader 140 and receive an output signal or a digital signal converted from the output signal. In other words, the controller 120 may output a control signal to apply the input signal to a connection structure of a first line and a second line in the interconnect layer 110 to which a physically unclonable function (PUF) is applied. Also, the controller 120 may receive an output signal (or signal corresponding to the output signal) corresponding to the input signal applied to the foregoing connection structure to which the PUF is applied.

The driver 130 may receive the control signal from the controller 120. The driver 130 may provide the input signal corresponding to the control signal to the plurality of first lines L1. To this end, the driver 130 may be connected to the plurality of first lines L1.

For example, the driver 130 may include a decoder. The driver 130 may decode the control signal. The driver 130 may control each of the first lines L10 to L1n-1 on the basis of the decoding result of the control signal. For example, the driver 130 may apply the input signal to the first lines on the basis of the decoding result at certain timings, periods, or times (time intervals).

The reader 140 may be connected to the plurality of second lines L2. The reader 140 may be connected to the second lines L2 and receive the output signal corresponding to the input signal. For example, the input signal may be applied to the 1-1 line L10, and the 1-1 line L10 and the 2-3 line L22 may be electrically connected through a via or contact. Here, the input signal applied to the 1-1 line L10 may be the output signal of the 2-3 line L22. In this specification, when a first line and a second line are connected and the input signal is applied to the first line, the output signal of the second line is "1." Also, when a first line and a second line are not connected and the input signal is applied to the first line, the output signal of the second line is "0." However, these values of the output signal or the input signal may change depending on connection structures of the first lines and the second lines or the arrangement and connection of additional elements in the interconnect layer.

The security part 150 may perform authentication on the basis of the output signal of the reader 140. The security part 150 may generate an identification key or a security key (or authentication key) on the basis of the output signal or receive a generated identification key or a security key to perform authentication.

According to an exemplary embodiment, the security part 150 may determine whether the interconnect layer operates on the basis of the identification key (the security key or the authentication key).

When an identification key corresponding to the applied control signal is received, the security part 150 may approve operation of the interconnect layer 110. On the other hand, when the identification key is not received, the security part 150 may not approve operation of the interconnect layer 110. In this case, the security part 150 may not approve operation of an interconnect layer of not only the lower die but also the upper die. In other words, the security part 150 may detect a physical attack, such as invasion or the like into the upper side or lower side of the substrate, according to whether the identification key is received. In this way, when the identification key is received, the security part 150 may determine that there is no physical attack and allow the interconnect layer 110 to operate. On the other hand, when the identification key is not received, the security part 150 may determine that there is a physical attack and may not allow the interconnect layer 110 to operate.

The generator 160 may include a random number generator. For example, the generator may include a true-random-number generator (TRNG).

The generator 160 may change an input sequence in which the input signal is input to the first lines L1. Also, the generator 160 may change a receiving sequence in which the output signal is received from the second lines L2.

Figure 3:
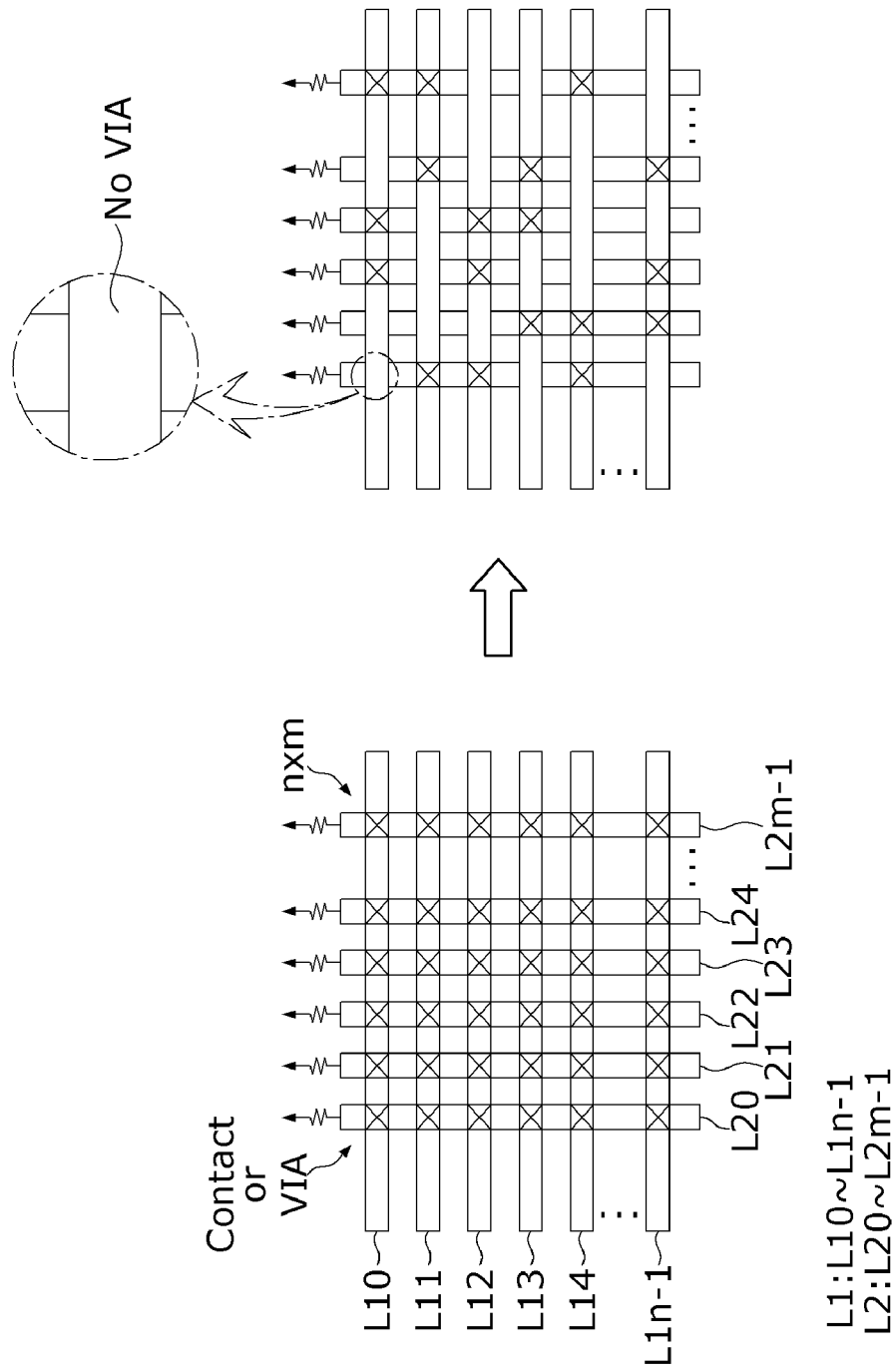
FIG. 3 is a diagram illustrating a partial structure of an interconnect layer in the security device according to the exemplary embodiment.
Figure 4:
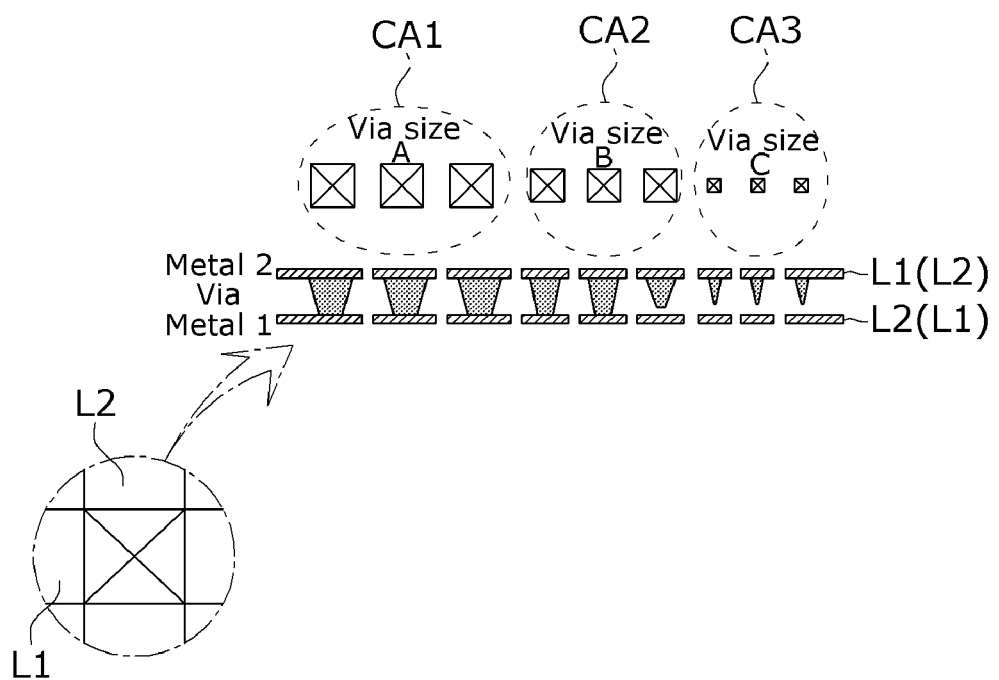
FIG. 4 is a conceptual diagram illustrating vias in the interconnect layer of the security device according to the exemplary embodiment.
Figure 5:
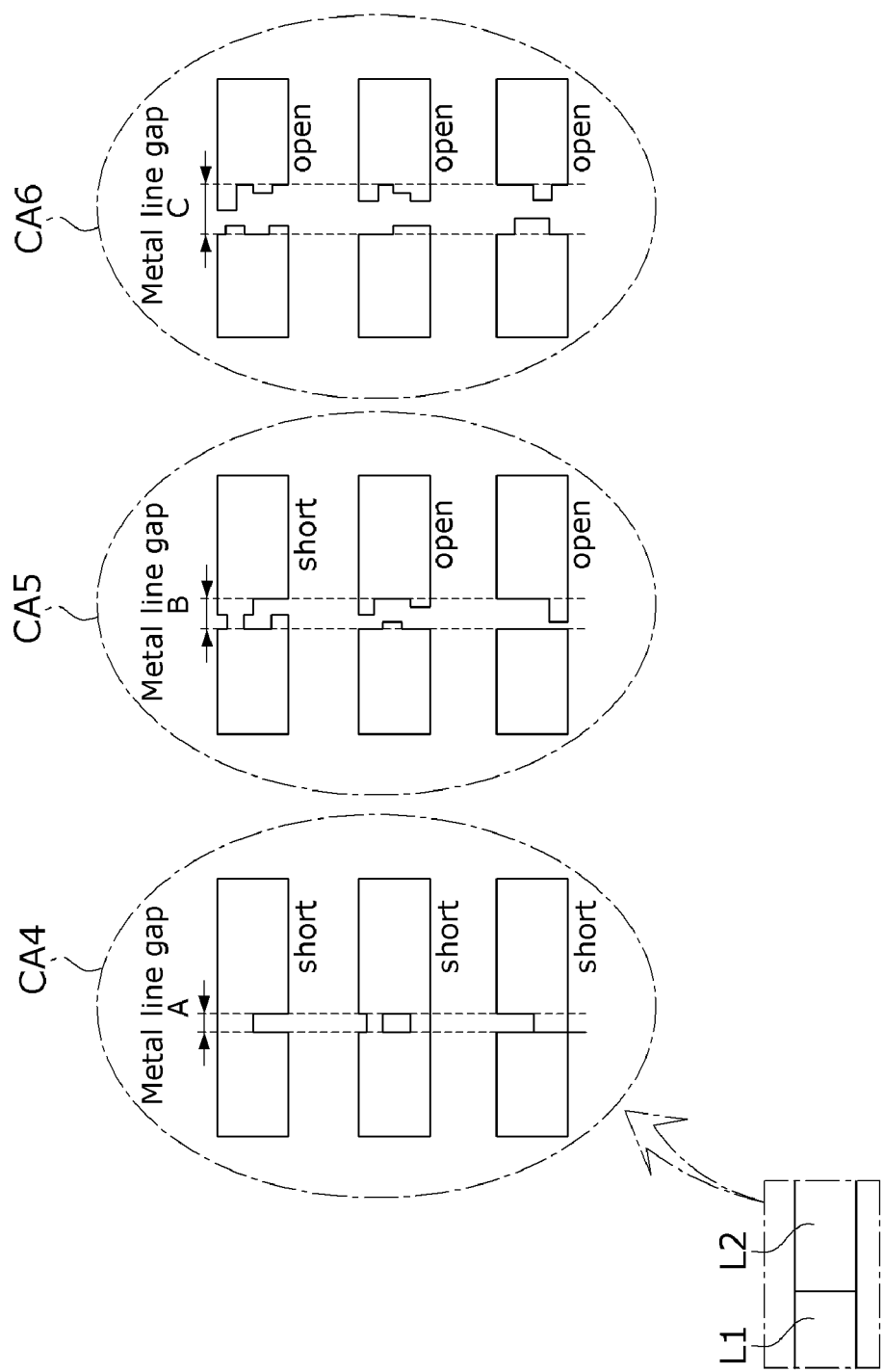
FIG. 5 is a conceptual diagram illustrating metal lines in the interconnect layer of the security device according to the exemplary embodiment.
Figure 6:
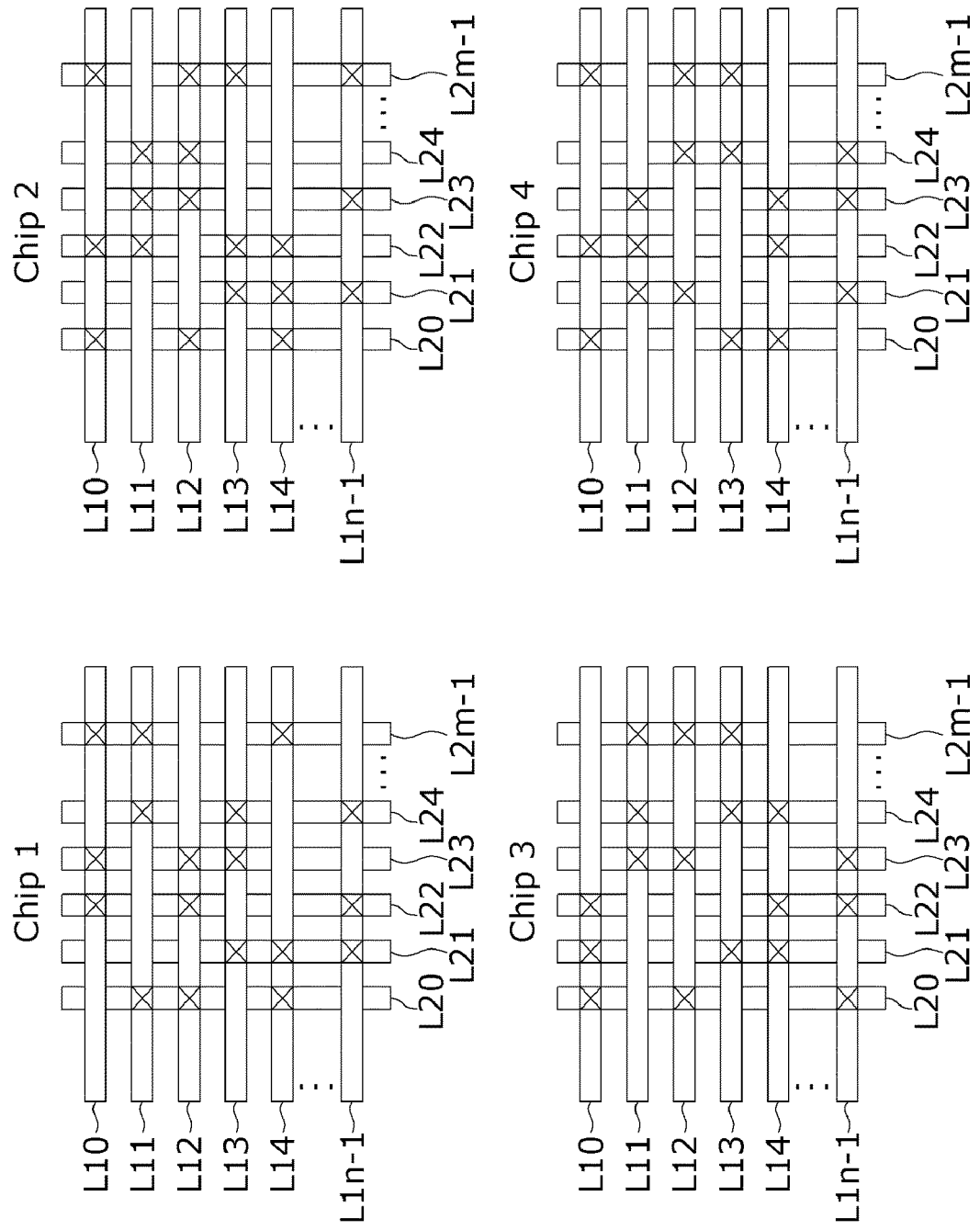
FIG. 6 is a conceptual diagram illustrating various formations of vias or contacts in the interconnect layer of the security device according to the exemplary embodiment.

FIG. 3 is a diagram illustrating a partial structure of an interconnect layer in the security device according to the exemplary embodiment. FIG. 4 is a conceptual diagram illustrating vias in the interconnect layer of the security device according to the exemplary embodiment. FIG. 5 is a conceptual diagram illustrating metal lines in the interconnect layer of the security device according to the exemplary embodiment. FIG. 6 is a conceptual diagram illustrating various formations of vias or contacts in the interconnect layer of the security device according to the exemplary embodiment.

Referring to FIG. 3, in the security device according to the exemplary embodiment, the interconnect layer may include the plurality of first lines L1 and the plurality of second lines L2 as described above.

The interconnect layer may include at least one of contacts and vias that are designed and manufactured according to a standard deviating from design rules prescribed for a semiconductor fabrication process.

The contacts and vias may be intentionally designed with randomness in a semiconductor fabrication process to randomly short or open the gap between first and second lines. The connection characteristics of the contacts and vias of the interconnect layer formed in this way may be measured and expressed as resistance values between the first and second lines connected through the contacts and vias. For example, whether first and second lines are electrically shorted may be determined by comparing the resistance value of a contact or via in the interconnect layer with a certain threshold value.

In the security device according to the exemplary embodiment, when input signals or control signals are the same, the output signal or identification key may be time-invariant, which means that the output signal or identification key does not change over time. Once a plurality of contacts/vias in a plurality of interconnect layers which are intentionally designed with randomness are manufactured, the connection states (e.g., currents, voltages, resistances, or digitized binary values thereof) do not change, that is, are invariant over time.

Therefore, according to the exemplary embodiment, the plurality of first lines L1 and the plurality of second lines L2 may be randomly connected. Whether a first line and a second line are shorted may be determined by a formed contact or via. Also, an output signal or an identification key corresponding to the output signal may be finally determined according to a contact or via. Therefore, the identification key may be a random number and time-invariant, that is, not changing over time. However, the identification key may change according to a change of the input signal or the like.

According to the exemplary embodiment, when contacts or vias are intentionally designed in a smaller size than that determined in design rules, some contacts or vias may short a first line and a second line, and other contacts or vias may not short a first line and a second line. Whether a first line and a second line are shorted may be probabilistically determined.

Additionally referring to FIG. 4, in a semiconductor fabrication process, vias may be formed between a metal 1 (e.g., a first line L1) and a metal 2 (e.g., a second line L2).

In a group CA1 of which via sizes are sufficiently large according to design rules, all vias short the metal 1 and the metal 2, and all information about whether the metal 1 and the metal 2 are shorted may be expressed as a digital value of 0.

On the other hand, in a group CA3 of which via sizes are very small, none of vias short the metal 1 and the metal 2. Therefore, all information about whether the metal 1 and the metal 2 are shorted may be expressed as a digital value of 1.

Meanwhile, in a group CA2 of which via sizes are between those of the groups CA1 and CA3, some vias short the metal 1 and the metal 2, and a remaining via does not short the metal 1 and the metal 2.

In the interconnect layer of the security device according to the exemplary embodiment, via sizes may be set so that some vias short the metal 1 and the metal 2 and a remaining via does not short the metal 1 and the metal 2.

Design rules for via size may vary by semiconductor fabrication process. Whether a first line and a second line are shorted may be probabilistically distributed. Whether a first line and a second line are shorted may ideally have a possibility of 50% but may have a different value.

Additionally referring to FIG. 5, as described above, the gap between metal lines (a first line and a second line) may be adjusted to probabilistically determine whether the metal lines (the first line and the second line) are shorted.

In a group CA4 of which the gaps between metal lines are small enough to ensure shorts between the metal lines, all the metal lines may be shorted.

On the other hand, in a group CA6 of which the gaps between metal lines are very large, none of the metal lines may be shorted.

In the interconnect layer of the security device according to the exemplary embodiment, first lines and second lines may be set with a metal line gap that probabilistically results in a short, that is, shorts some metal lines and does not short other metal lines, as shown in a group CA5.

Referring to FIGS. 3 and 6, according to chip fabrication (or assembly), a via (or contact) (hereinafter described as "via") may be randomly formed in each region at which a first line crosses a second line.

In other words, even in the case of trying to form n×m vias at crossing regions between the first lines L1 and the second lines L2 according to the arrangement of the first lines L1 and the second lines L2 of the interconnect layer, it is possible to randomly short or open the gap between the first lines L1 and the second lines L2.

Due to such randomness, in a plurality of chips Chip1 to Chip4 assembled as shown in the drawing, the locations and number of vias between the first lines L1 and the second lines L2 of the interconnect layer may vary.

Figure 7:
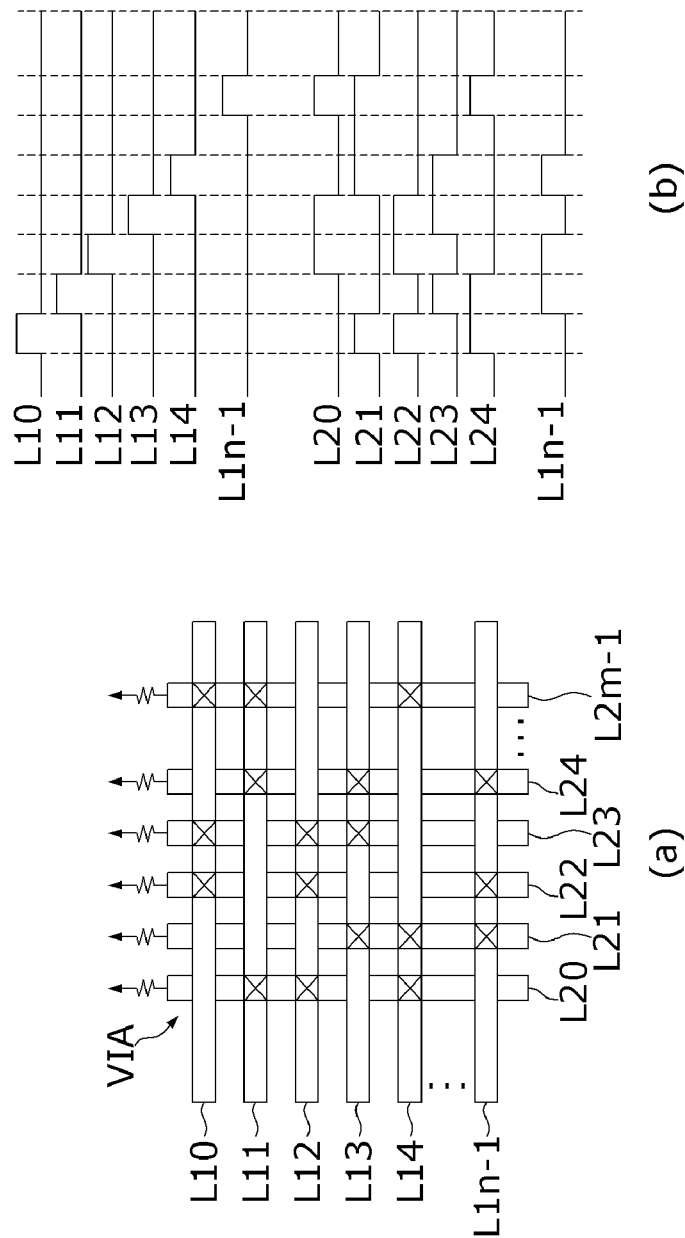
FIG. 7 is a timing diagram illustrating an operation of the interconnect layer in the security device according to the exemplary embodiment.

FIG. 7 is a timing diagram illustrating an operation of the interconnect layer in the security device according to the exemplary embodiment.

FIG. 7A shows first lines, second lines, and vias of the chip Chip1 shown in FIG. 6, and FIG. 7B is a timing diagram of FIG. 7A.

For example, an input signal may be applied to a plurality of first lines L10 to L1n-1. The input signal may be applied to the plurality of first lines L10 to L1n-1 at time intervals. For example, the number of first lines is n, and the first lines may include the 1-1 line L10 to the 1-n line L1n-1 which are sequentially disposed. The input signal may be sequentially applied to the plurality of first lines L10 to L1n-1 at certain time intervals.

Likewise, the number of second lines is m, and the second lines may include a 2-1 line L20 to the 2-m line L2m-1 which are sequentially disposed.

In the chip Chip1, vias may be formed at (1, 3), (1, 4), and (1, m) in the first row, and the 1-1 line L10 may be connected to the 2-3 line L22, the 2-4 line L23, and the 2-m line L2m-1 through vias. Accordingly, when a certain voltage or the like is applied to the 1-1 line L10, the 2-3 line L22, the 2-4 line L23, and the 2-m line L2m-1 may provide a certain current or voltage (e.g., "1") as an output signal according to the input signal. Unlike this, lines not connected to the 1-1 line L10 may provide "0" as an output signal. This is illustrative description, and a second line not connected to the 1-1 line L10 may provide "1" as an output signal through a first line which is connected to any one of the 2-3 line L22, the 2-4 line L23, and the 2-m line L2m-1 through a via.

An output signal may have intervals corresponding to the total time of the input signal. For example, the output signal may have a period corresponding to the total time in which the input signal is applied to the plurality of first lines. Accordingly, it is possible to reduce noise signals other than the output signal using the period of the output signal.

Figure 8:
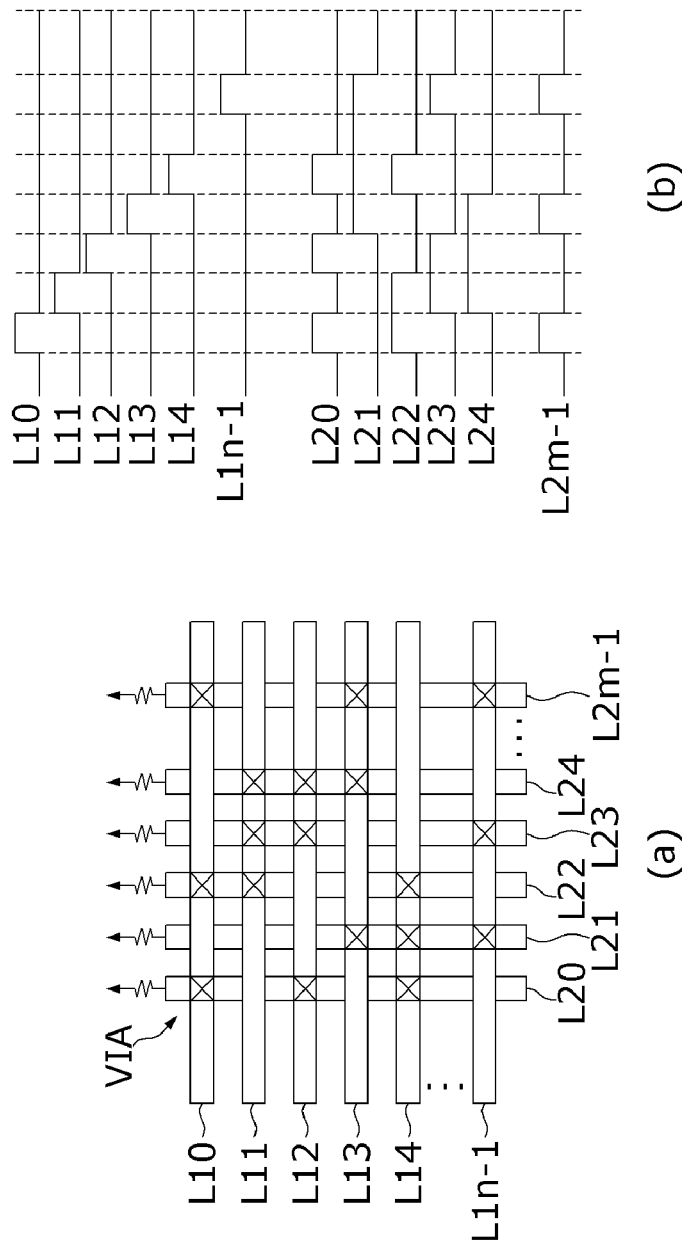
FIG. 8 is another timing diagram illustrating an operation of the interconnect layer in the security device according to the exemplary embodiment.

FIG. 8 is another timing diagram illustrating an operation of the interconnect layer in the security device according to the exemplary embodiment.

Specifically, FIG. 8A shows first lines, second lines, and vias of the chip Chip2 shown in FIG. 6, and FIG. 8B is a timing diagram of FIG. 8A.

Referring to FIG. 8, in the chip Chip2 of FIG. 6, vias may be formed at (1, 1), (1, 3), and (1, m) in the first row, and the 1-1 line L10 may be connected to the 2-1 line L20, the 2-3 line L22, and the 2-m line L2m-1 through the vias. Accordingly, when a certain voltage or the like is applied to the 1-1 line L10, the 2-1 line L20, the 2-3 line L22, and the 2-m line L2m-1 may provide a certain current or voltage (e.g., "1") as an output signal according to the input signal. Unlike this, lines not connected to the 1-1 line L10 may provide "0" as an output signal.

In this way, even when chips are fabricated through the same semiconductor process or on the same wafer, different connections may be formed in the shielding structures of the chips.

Figure 9:
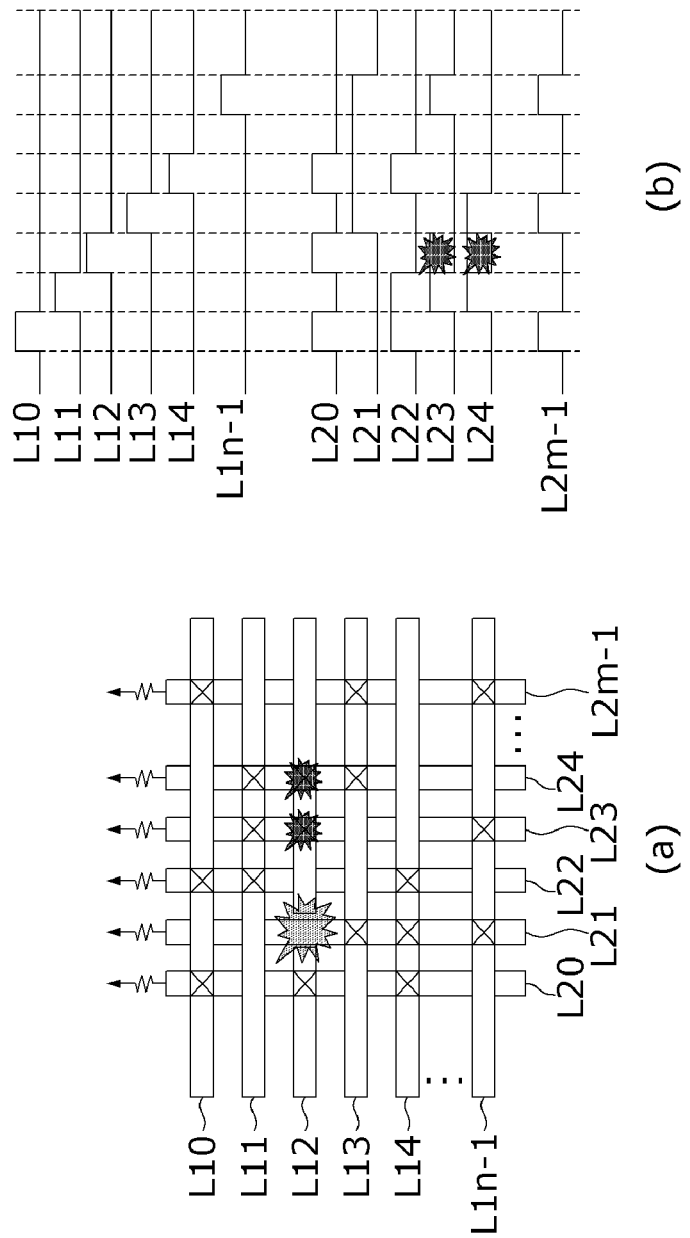
FIG. 9 is a timing diagram illustrating an operation of the interconnect layer when there is a partial attack in FIG. 8.

FIG. 9 is a timing diagram illustrating an operation of the interconnect layer when there is a partial attack in FIG. 8.

Specifically, FIG. 9A shows the chip Chip2 shown in FIG. 6, and FIG. 9B is a timing diagram of FIG. 9A.

Referring to FIG. 9, in the chip Chip2, the 1-3 line L12 may be opened at (3, 2) by an invasive attack or the like. Accordingly, a via at (3, 2) may be removed.

Even when an input signal is applied in the same way as in FIG. 8, the output signal may vary due to such an attack.

As shown in the drawing, when a certain voltage or the like is applied to the 1-3 line L12, the 2-1 line L20 may provide "1" as the output signal, but the 2-4 line L23 and the 2-5 line L24 may provide "0" as the output signal due to the attack.

As described above, an output signal (the signal of a second line) of FIG. 8B may differ from the output signal (the signal of the second line) of FIG. 9B. Accordingly, the security part may not generate an identification key for authentication on the basis of the change in the output signal. This prevents authentication from occurring, and the security part may determine not to allow the interconnect layer or substrate to operate. Consequently, security against an invasive attack and the like can be further enhanced.

Figure 10:
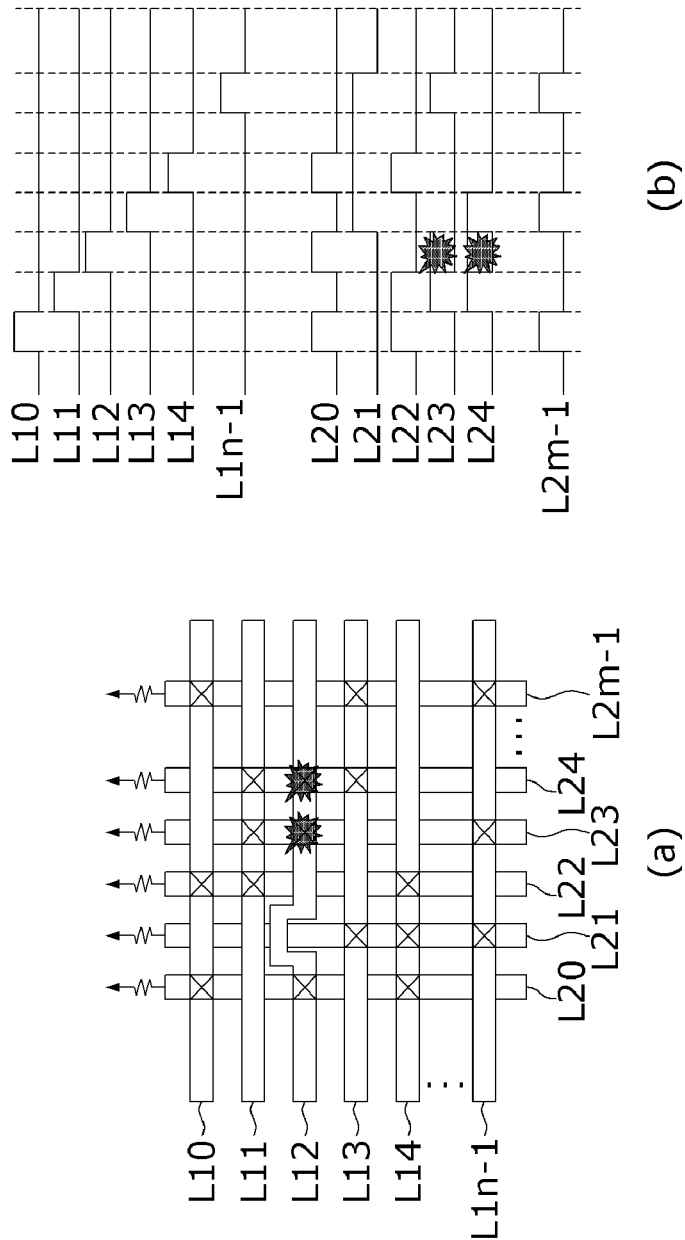
FIG. 10 is a timing diagram illustrating an operation of the interconnect layer when there is a modification in FIG. 9 after the partial attack.

FIG. 10 is a timing diagram illustrating an operation of the interconnect layer when there is a modification in FIG. 9 after the partial attack.

Specifically, FIG. 10A shows the chip Chip2 of FIG. 6 which is edited by an attack, and FIG. 10B is a timing diagram of FIG. 10A.

Referring to FIG. 10, after the invasive attack of a focused ion beam (FIB) shown in FIG. 9, the open 1-3 line L12 may be edited (or reconnected) and restored to the connection state before the attack as shown in FIG. 8.

However, the resistance of the line may change regardless of such restoration of the connection state. In other words, the security device according to the exemplary embodiment can detect editing or restoration after an attack. Accordingly, even after editing or restoration, the security part can determine not to allow the interconnect layer or substrate to operate. Consequently, security against an invasive attack and the like can be further enhanced.

According to the exemplary embodiment, the controller may calculate a resistance according to an input signal and an output signal and store the resistance in a storage (not shown). On the basis of the resistance, the security part can not only determine whether there is an attack but also detect reconnection, editing, or the like after an attack.

Figure 11:
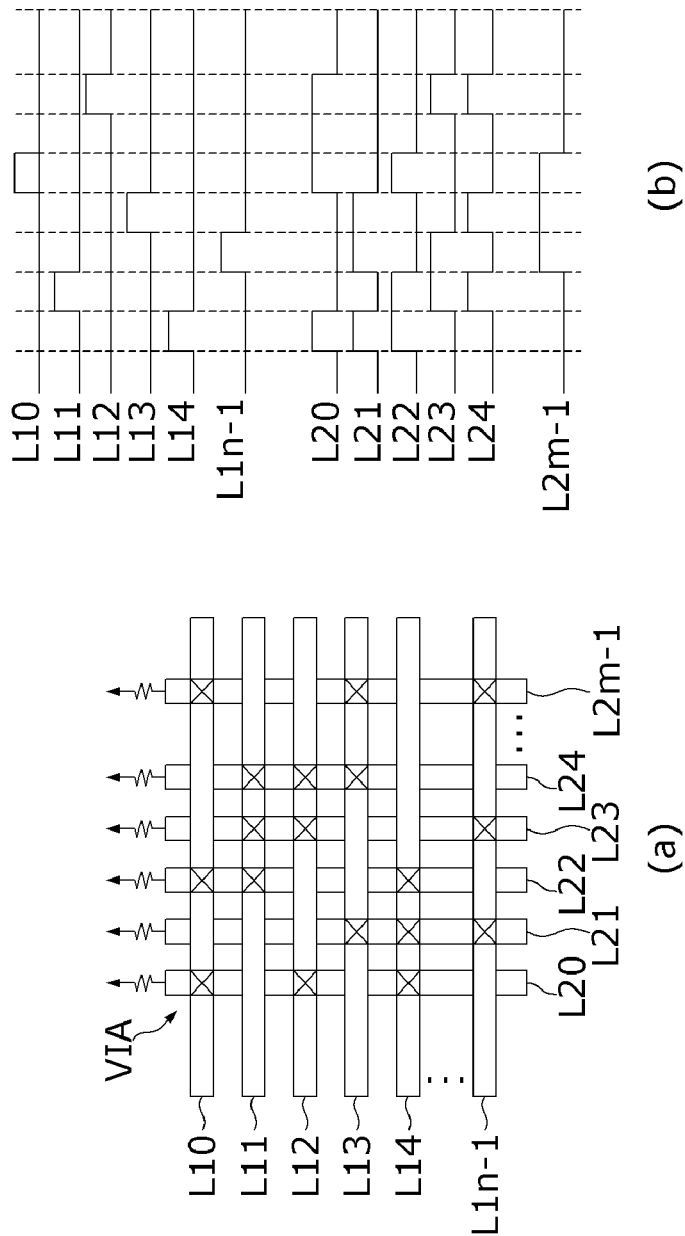
FIG. 11 is a timing diagram illustrating an operation of the interconnect layer according to a generator in the security device according to the exemplary embodiment.

FIG. 11 is a timing diagram illustrating an operation of the interconnect layer according to the generator in the security device according to the exemplary embodiment.

Specifically, FIG. 11A shows the chip Chip2 shown in FIG. 6, and FIG. 11B is a timing diagram of FIG. 11A.

Referring to FIG. 11, the generator of the security device may change a sequence in which an input signal is input to a plurality of first lines.

According to the exemplary embodiment, an input signal may be applied to the plurality of first lines L10 to L1n-1. The input signal may be applied to the plurality of first lines L10 to L1n-1 at time intervals. For example, the number of first lines is n, and the first lines may include the 1-1 line L10 to the 1-n line L1n-1 which are sequentially disposed. The input signal may not be sequentially applied to the plurality of first lines L10 to L1n-1 at certain time intervals. The generator may not sequentially apply the input signal to the plurality of first lines L10 to L1n-1 in FIG. 8. Accordingly, security can be further enhanced by the shielding structure.

In addition, the generator may change not only the sequence for an input signal but also a sequence in which output signals are received from the plurality of second lines L20 to L2m-1. Accordingly, security can be further enhanced by the shielding structure.

Figure 12:
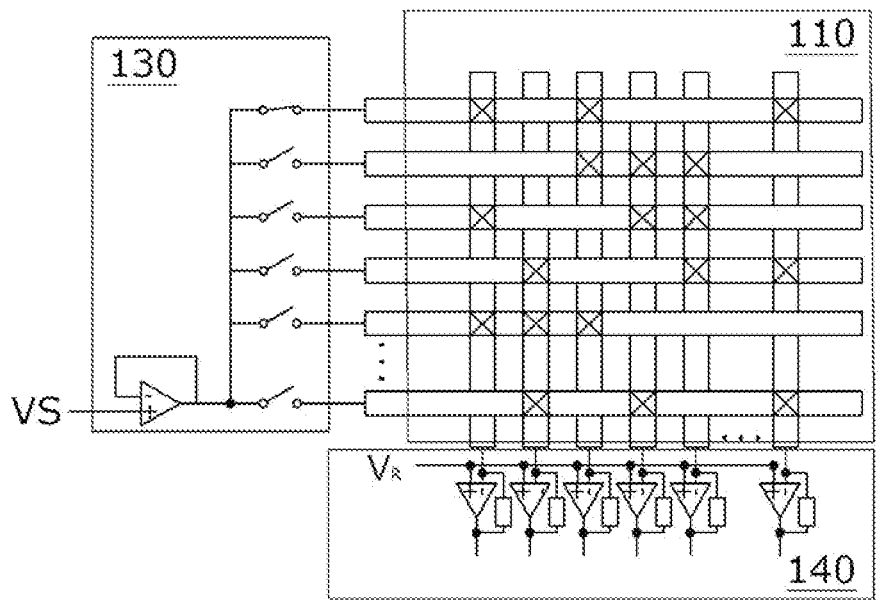
FIG. 12 is a diagram showing a usage example of the security device according to the exemplary embodiment.
Figure 13:
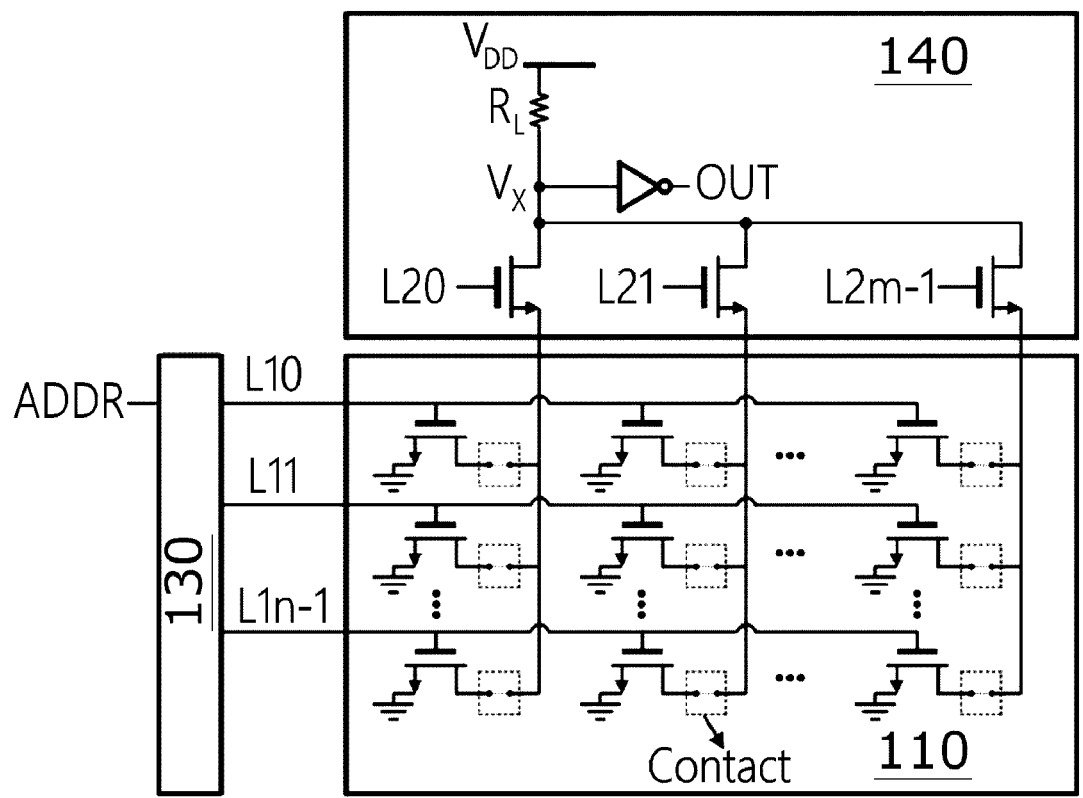
FIG. 13 is a diagram showing another usage example of the security device according to the exemplary embodiment.

FIG. 12 is a usage example of the security device according to the exemplary embodiment, and FIG. 13 is another usage example of the security device according to the exemplary embodiment.

According to the exemplary embodiment, the driver 130 may include a decoder. The driver 130 may be connected to the plurality of first lines L10 to L1n-1. Also, the reader 140 may include a current sensing circuit.

Referring to FIG. 12, the driver 130 may include an operational amplifier (op-amp) and switch elements. The reader 140 may include op-amps, resistors, and the like. For example, each of the second lines L20 to L2m-1 may be connected to the inverting terminal of an op-amp, and a common voltage VR may be connected and applied to the non-inverting terminal of each op-amp.

Referring to FIG. 13, the interconnect layer may include a switching part disposed between the first lines L10 to L1n-1 and the second lines L20 to L2m-1. According to the exemplary embodiment, the interconnect layer 110 may include a plurality of first transistors each of which is disposed between one of the first lines L10 to L1n-1 and one of the second lines L20 to L2m-1.

Further, the plurality of first transistors may be connected to second transistors disposed in the second lines L20 to L2m-1 and the foregoing contacts (or vias). In other words, the plurality of first transistors and the plurality of second transistors may be randomly connected through the contact or vias.

In addition, the first lines, the second lines, the driver, and the reader may be connected in various ways.

Figure 14:
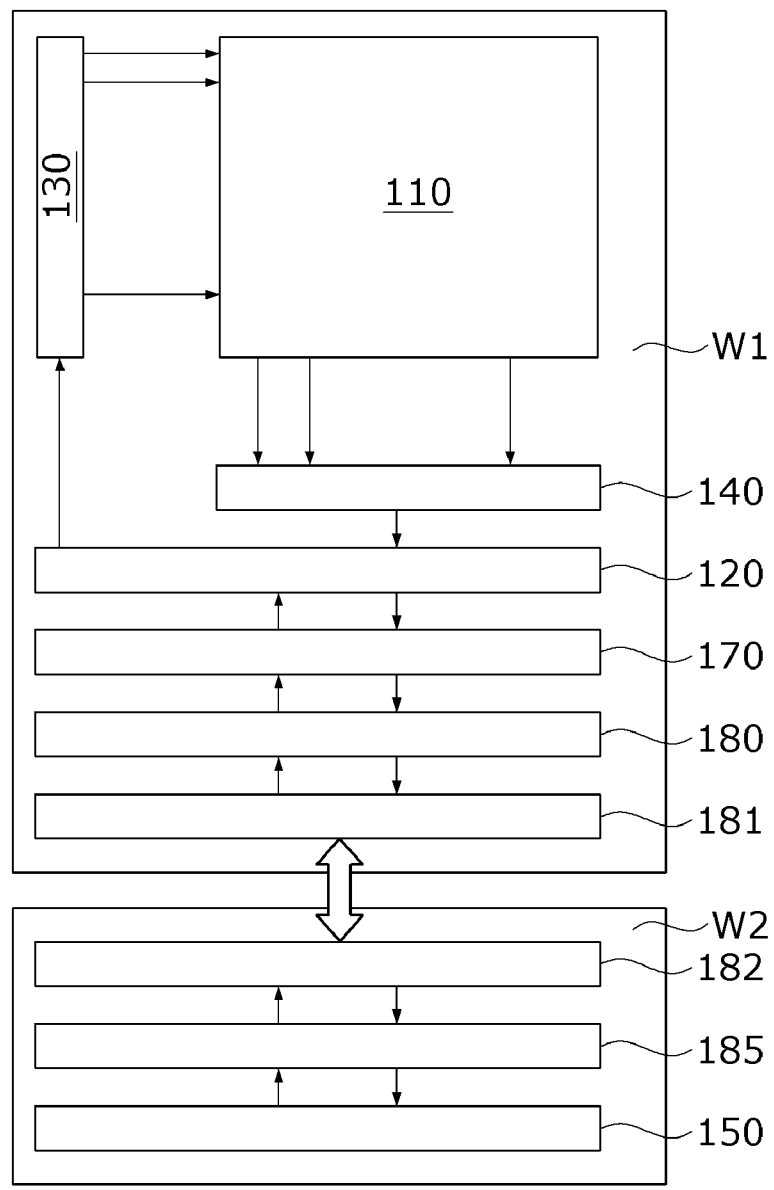
FIG. 14 is a diagram showing a usage example of the substrate according to the exemplary embodiment.
Figure 15:
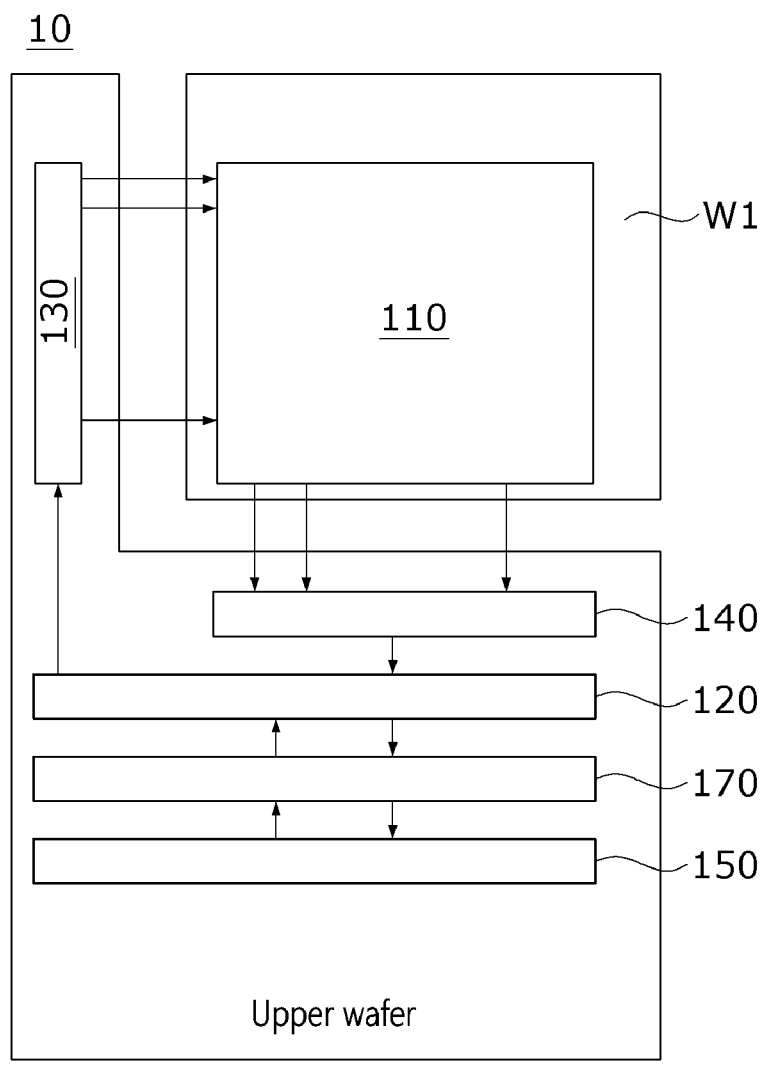
FIG. 15 is a diagram showing another usage example of the substrate according to the exemplary embodiment.

FIG. 14 is a diagram showing a usage example of the substrate according to the exemplary embodiment, and FIG. 15 is a diagram showing another usage example of the substrate according to the exemplary embodiment.

Referring to FIG. 14, the substrate according to the exemplary embodiment may include a plurality of dies (wafers, chips, or the like) and connectors (e.g., wires, via electrodes, or the like) connecting the plurality of dies. Also, the substrate may include the lower die W1 and the upper die W2. The upper die W2 may be disposed on the lower die W1. The above description of the substrate other than the following description may apply to this usage example.

According to the usage example, the lower die W1 may include the interconnect layer 110, the controller 120, the driver 130, the reader 140, and the generator 160 (see FIG. 2). In addition, the lower die W1 may further include a key generator 170, a first interface part 180, and a first pad 181.

The upper die W2 may include the security part 150, a second interface part 185, and a second pad 182.

As described above, the interconnect layer 110 having the shielding structure including first lines and second lines may be disposed in the lower die W1, and other components may be disposed in the lower die W1 or the upper die W2.

The first interface part 180 and the second interface part 185 may include Universal Serial Bus (USB), FireWire, Thunderbolt, Institute of Electrical and Electronics Engineers (IEEE) 802.11x, IEEE 802.16x, Global System for Mobile Communications (GSM), Code-Division Multiple Access (CDMA), Time-Division Multiple Access (TDMA), Global Positioning System (GPS), infrared (IR), Bluetooth, ZigBee, Serial Peripheral Interface (SPI), Inter-Integrated Circuit ($I^2C$) or other similar type of interfaces.

The first pad 191 and the second pad 192 may be electrically connected through the foregoing connectors.

Further, the key generator 170 may generate an identification key on the basis of an output signal. The identification key may be, for example, an N-bit (N is a natural number) digital value. However, the identification key is not limited thereto. The security part 150 may compare the generated identification key with an identification key based on a certain output signal corresponding to a certain input signal. For example, the security part 150 may generate an identification key for authentication in response to only an output signal corresponding to a specific input signal. Accordingly, security can be maintained even when an input signal is manipulated.

Referring to FIG. 15, in the present embodiment, the substrate 10 may include the plurality of dies (wafers, chips, or the like) and the connectors (e.g., wires, via electrodes, or the like) connecting the plurality of dies as described above. Also, the substrate may include a lower die W1 and an upper die W2. The upper die W2 may be disposed on the lower die W1. The above description of the substrate other than the following description may apply to this usage example.

According to this usage example, only the interconnect layer 110 having the shielding structure may be disposed in the lower die W1. The controller 120, the driver 130, the reader 140, the security part 150, and the generator 160, which are components other than the interconnect layer 110, may be disposed in the upper die W2. As the interconnect layer 110 including the shielding structure of the lower die W1, the plurality of connectors for connection with the plurality of lines may be disposed in the upper die W2 and the lower die W1.

As used herein, the term "part" refers to a software or hardware component, such as a field-programmable gate array (FPGA) or application-specific integrated circuit (ASIC), which performs certain roles. However, the term "part" is not meant to be limited to software or hardware. A "part" may be included in an addressable storage medium or configured to operate one or more processors. Therefore, as an example, a "part" includes components, such as software components, object-oriented software components, class components, and task components, processes, functions, attributes, procedures, subroutines, segments of program code, drivers, firmware, microcode, circuitry, data, databases, data structures, tables, arrays, and variables. Functionality provided in components and "parts" may be combined into fewer components and "parts" or may be further subdivided into additional components and "parts." In addition, components and "parts" may be implemented to operate one or more central processing units (CPUs) in a device or a secure multimedia card.

According to embodiments, it is possible to implement a security device of which security is enhanced using an identification key to which the time-invariant PUF technology is applied through a semiconductor fabrication process, and a substrate including the security device.

According to embodiments, it is also possible to implement a security device of which security against attacks (invasive attacks) on a chip or package substrate is enhanced by employing a shielding structure in a lower die, and a substrate including the security device.

According to embodiments, it is also possible to implement a security device of which security is enhanced by changing a sequence in which an input signal is input to lines or an output signal is received from lines, and a substrate including the security device.

Various advantages and effects of the present invention are not limited to those described above and may be easily understood from the above process of describing specific embodiments of the present invention.

Although exemplary embodiments of the present invention have been mainly described, these are merely illustrative and do not limit the present invention, and those of ordinary skill in the art should know that various modifications and applications not illustrated above can be made without departing from the essential characteristics of the exemplary embodiments. For example, each component specified in an embodiment can be implemented in a modified form. In addition, differences of the modifications and applications are construed as falling within the scope of the present invention defined in the following claims.

What is claimed is:

1. A security device comprising:
   an interconnect layer including first lines and second lines;
   a controller configured to output a control signal to the interconnect layer;
   a driver configured to apply an input signal to the first lines according to the control signal;
   a reader connected to the second lines and configured to receive an output signal corresponding to the input signal; and
   a security part configured to perform authentication on the basis of the output signal;
   wherein whether the interconnect layer is shorted varies depending on a process variation occurring in a semiconductor fabrication process;
      wherein the interconnect layer includes at least one of contacts and vias that are designed and manufactured according to a standard deviating from design rules prescribed for the semiconductor fabrication process;
      wherein (1) the first lines are randomly connected to the second lines through the contacts or the vias and/or (2) whether the first lines and the second lines are shorted is fixed and invariant over time.

2. The security device of claim 1, wherein any one of the first lines crosses the second lines, and
any one of the second lines crosses the first lines.

3. The security device of claim 1, further comprising a generator including a true-random-number generator (TRNG),
wherein the generator changes an input sequence in which the input signal is input to the first lines or a receiving sequence in which the output signal is received from the second lines.

4. The security device of claim 1, wherein the controller calculates a resistance according to the input signal and the output signal and stores the resistance in a storage.

5. The security device of claim 1, further comprising a key generator configured to generate an identification key on the basis of the output signal, wherein the security part determines whether the interconnect layer operates on the basis of the identification key.

6. The distributed device of claim 5, wherein the security part compares the identification key generated by the key generator with a certain output signal corresponding to a certain input signal.

7. The security device of claim 1, wherein the driver includes a decoder, and the reader includes a current sensing circuit.

8. The security device of claim 1, wherein the interconnect layer includes a plurality of first transistors disposed between the first lines and the second lines, and the plurality of first transistors are randomly connected to the plurality of second transistors.

9. The security device of claim 1, wherein the input signal is applied to the first lines at time intervals.

10. The security device of claim 9, wherein the output signal has a period corresponding to a total time in which the input signal is applied to the first lines.

11. A security device comprising:
   an interconnect layer including first lines and second lines which extend in different directions and cross each other;
   a controller configured to output a control signal to the interconnect layer;
   a driver configured to apply an input signal to the first lines according to the control signal; and
   a reader connected to the second lines and configured to receive an output signal corresponding to the input signal, wherein whether the interconnect layer is shorted varies depending on a process variation occurring in a semiconductor fabrication process;
   wherein whether the interconnect layer is shorted varies depending on a process variation occurring in a semiconductor fabrication process;
      wherein the interconnect layer includes at least one of contacts and vias that are designed and manufactured according to a standard deviating from design rules prescribed for the semiconductor fabrication process;
      wherein (1) the first lines are randomly connected to the second lines through the contacts or the vias and/or (2) whether the first lines and the second lines are shorted is fixed and invariant over time.

12. A substrate comprising:
    a lower die; and
    an upper die disposed on and electrically connected to the lower die, wherein at least one of the upper die and the lower die comprises:
    an interconnect layer including first lines and second lines which extend in different directions and cross each other;
    a controller configured to output a control signal to the interconnect layer;
    a driver configured to apply an input signal to the first lines according to the control signal;

a reader connected to the second lines and configured to receive an output signal corresponding to the input signal; and a security part configured to perform authentication on the basis of the output signal;

wherein whether the interconnect layer is shorted varies depending on a process variation occurring in a semiconductor fabrication process;

wherein the interconnect layer includes at least one of contacts and vias that are designed and manufactured according to a standard deviating from design rules prescribed for the semiconductor fabrication process;

wherein (1) the first lines are randomly connected to the second lines through the contacts or the vias and/or (2) whether the first lines and the second lines are shorted is fixed and invariant over time.

13. The substrate of claim 12, wherein at least one of the first lines and the second lines are disposed in a lower region of the lower die.

14. The substrate of claim 12, wherein the interconnect layer includes at least one of contacts and vias that are designed and manufactured according to a standard deviating from design rules prescribed for a semiconductor fabrication process, and the first lines are randomly connected to the second lines through the contacts and the vias.

15. The substrate of claim 12, further comprising a generator configured to generate an identification key on the basis of the output signal, wherein the security part compares the identification key with a certain output signal corresponding to a certain input signal.

* * * * *